Nov. 9, 1965    N. T. GENERAL    3,216,283
VARIABLE SPEED TORQUE TRANSMITTING MEANS
Filed March 4, 1963

Norman T. General
INVENTOR.

BY John R. Faulkner
Robert E. McCollum
ATTORNEYS.

United States Patent Office 3,216,283
Patented Nov. 9, 1965

3,216,283
VARIABLE SPEED TORQUE TRANSMITTING MEANS
Norman T. General, Orchard Lake, Mich., assignor to Ford Motor Company, Dearborn, Mich., a corporation of Delaware
Filed Mar. 4, 1963, Ser. No. 262,778
11 Claims. (Cl. 74—730)

This invention relates to a torque transmitting mechanism, and more particularly to a variable speed friction drive providing an infinite number of speed ratio changes in one direction of rotation, a drive in the opposite direction, and a neutral condition of operation.

One of the objects of the invention is to provide a transmission that is economical to manufacture, simple in design, and provides very smooth changes in speed ratios.

Another object of the invention is to provide an infinitely variable friction drive transmission having selectively operable means to reverse the direction of rotation of the power output friction members.

Another object of the invention is to provide a transmission combining an infinitely variable friction drive with a hydrodynamic drive device selectively controllable to interrupt the transmission of torque to a power output shaft.

A further object of the invention is to provide a torque transmitting apparatus providing an infinite number of speed ratio changes between predetermined underdriven and overdriven ratios, a reverse drive, and a neutral condition of operation, by the combination of a variable speed friction drive mechanism, a hydrodynamic drive device selectively filled and emptied of fluid, and a direction reversing selectively operable mechanism.

Figure 1:
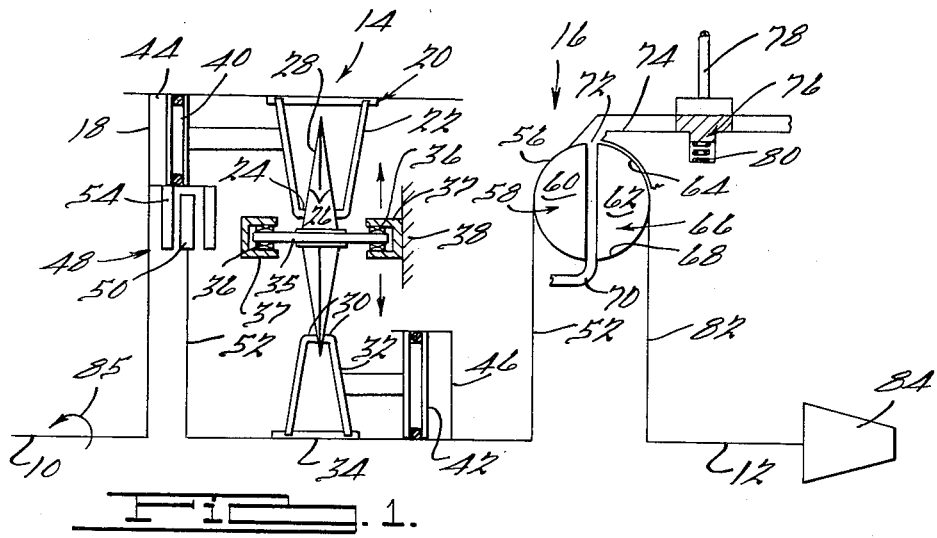
Figure 2:
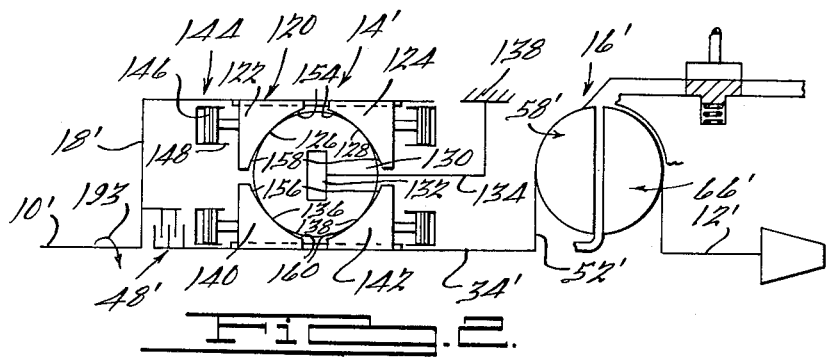
Figure 3:
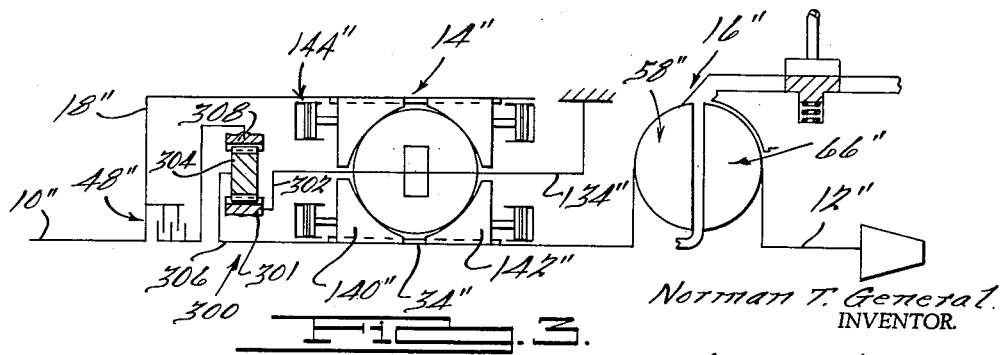

Other objects, features and advantages of the invention will become apparent upon reference to the succeeding, detailed description thereof, and to the drawings illustrating the preferred embodiments thereof; wherein, FIGURE 1 is a schematic illustration of one form of transmission embodying the invention, FIGURE 2 is a schematic illustration of a second transmission embodying the invention; and, FIGURE 3 is a schematic illustration of a modification of the FIGURE 2 transmission.

FIGURE 1 shows, in general, power input and output shafts 10 and 12 connected for a drive therebetween by an infinitely variable speed friction disc drive mechanism 14 and a hydrodynamic drive device or fluid coupling 16. More specifically, shaft 10, which is driven by any suitable source of power, such as, for example, the internal combustion engine of a motor vehicle, is drive connected by a shell member 18 to the outer annulus member 20 of the variable speed drive 14. Annular member 20 comprises a number of oppositely facing spaced conical driving discs 22 axially slidably splined to the shell 18, and having contact rims 24 engaging the cooperating conical surfaces 26 of an idler disc 28. The opposite peripheral portion of the disc 28 engages the contact rims 30 of a number of spaced conical inner discs 32 axially slidably splined to an intermediate shaft 34. The disc 28 is axially slidably splined to a shaft 35 rotatably mounted by bearings 36 on portions 37 of a carrier member 38. The carrier is nonrotatably mounted in a stationary portion of the transmission casing (not shown); however, the portion 37 supporting the shafts 35 are movable radially in opposite directions to vary the speed ratio of the disc drive.

The disc drive operates in a known manner producing a sliding fluid friction drive between the members through the agency of a thin film of fluid sprayed or otherwise drawn into the contact region or patch between the outer and inner disc contact rims and disc 28. The contact rims and cone disc 28 are loaded into driving engagement with each other by a number of pistons 40, 42 operating in fluid pressure cylinders 44, 46 and applying an axial pressure against the slidable left and right hand outer and inner discs 22 and 32, respectively, as shown. The oppositely facing right and left hand splined discs 22 and 32, respectively, are substantially fixed against axial sliding movement against a backing member, not shown. The rotation of discs 22 therefore rotates disc 28 in the same direction to rotate discs 32 in the opposite direction.

As stated previously, the disc drive is adjustable to vary the input to output shaft speed ratio in infinite amounts by radial movement of the carrier portions 37 in either direction, by means not shown, to change the radial position of disc 28 with respect to the points of contact with the outer and inner discs. That is, the speeds at which disc 28 is driven by discs 22, and the speeds at which the cone disc drive discs 32 change in inverse proportion to the change in the radial distance of the points of contact from the axis of rotation of the planet disc, due to the changes in peripheral velocity at the points of contact.

In the position shown, the disc 28 is adjusted to produce its maximum overdrive of the inner discs 32, with the distance from the outer disc contact rims 24 to the axis of disc 28 being at a minimum, while the distance from the axis to the inner disc contact rims 30 is at a maximum. Accordingly, drive of disc 28 by outer discs 22 will overspeed inner discs 32 to drive intermediate shaft 34 at a speed greater than the speed of input shaft 10. Radial displacement of the carrier portions 37 toward the discs 32 increases the distance from the outer disc contact rims 24 to the axis of disc 28, thus decreasing the speed of rotation of the hub of disc 28. A corresponding decrease in the peripheral speed of its points of contact with the inner discs 32 results due to the decreased radial distance between the inner disc contact rims and the axis of disc 28. The net change results in a reduction in speed of discs 32 as compared to the speed for the previous setting of the carrier portions 37. Further adjustment of the axis of disc 28 can be made in infinite amounts to a predetermined minimum underdrive ratio at which the inner discs 32 rotate at a speed slower than the speed of input shaft 10.

It is to be noted that the pistons 40, 42 are actuated to move discs 22 and 32 in timed relationship with the radial movement of carrier portions 37 to accommodate the axial movement of disc 28 on its splines.

A selectively operated clutch 48 between input shaft 10 and intermediate shaft 34 provides not only a direct drive of shaft 34 from shaft 10, thereby bypassing the friction drive mechanism 14, but also reverses the normal direction of rotation of discs 32 and shaft 34. The clutch is of a known fluid pressure actuated type having an annular friction disc 50 secured by a flange 52 to the intermediate shaft 34, and interleaved with similar friction discs 54 secured to the shell 18 for rotation therewith. At the time the clutch 48 is engaged, the loading pressure on the discs is reduced to a point preventing a drive through this mechanism. Friction losses are therefore reduced during this stage of operation.

The intermediate shaft 34 is drivingly connected by a flange member 52 to the outer semi-toroidal shroud 56 of a rotatable impeller 58 forming one element of the fluid coupling 16. The impeller has a number of blades 60, dish-shaped in cross section, facing a number of similarly shaped blades 62 secured within an outer shroud 64 of a turbine member 66. The shrouds together define a toroidal cavity 68 within which fluid circulates in a known manner to transmit the torque of the impeller to the turbine.

The coupling is of the fill and empty type; that is, it is adapted to be filled with operating fluid through an inlet line 70, connected through a control system (not shown) to a source of fluid under pressure, and discharges through an outlet 72 between the members into a passage 74. The passage is adapted to be connected to a sump, the flow of fluid therethrough being controlled by a selectively operable valve 76.

Valve 76, which is rotatable with the impeller shroud 56, is shown in a position blocking the exhaust of fluid from outlet 72. It is maintained in this position by fluid pressure admitted through a line 78 to act on the top of the valve. The line 78 is connected to the fluid pressure control system, which automatically schedules fluid to the line when a signal is received by the system that the coupling is to be filled. The valve is biased radially to a passage unblocking position, upon the vent of fluid in line 78, by the forces of a spring 80 and centrifugal force acting on the mass of the rotating valve to permit discharge of the operating fluid from the coupling, thereby rendering the coupling inoperable to transmit torque.

As shown, turbine 66 is drive connected by a flange 82 to the output shaft 12, which in turn drives a pinion gear 84 of a differential assembly.

For overall operation, initially, clutch 48 is disengaged and coupling 16 is empty of fluid due to valve 76 being moved by spring 80 to a position opening passage 72 to vent. The disc drive 14 is adjusted by movement of carrier portions 37 and pistons 40, 42 to the desired positions providing the particular speed ratio selected, the normal starting range being the lowest underdrive ratio.

To provide a drive, fluid pressure is supplied to line 78 moving valve 76 to block passage 74 and thereby permit filling of the coupling through line 70. Counterclockwise rotation of input shaft 10 in the direction of arrow 80 therefore rotates discs 22 and disc 28 in the same direction. The discs 32 are accordingly rotated in a clockwise direction at a reduced speed with respect to shaft 10, rotating shaft 34, impeller 58, turbine 66 and output shaft 12 at the same speed and in the same direction, which is opposite to that of the input shaft. To increase the speed of output shaft 12, the carrier portions 37 can be moved radially outwardly towards the discs 22 to progressively increase the speed of the disc 28, discs 32, and output shaft 12, until a maximum overdrive of output shaft 12 with respect to input shaft 10 is obtained.

A reverse drive is obtained by engaging clutch 48 and releasing the loading pressures on the inner and outer disc members in timed relationship, thereby directly connecting input shaft 10 and intermediate shaft 34, bypassing the friction disc drive 14. Accordingly, the output shaft will be rotated in the same direction and at the same speed as input shaft 10, except for hydraulic losses in coupling 16.

The transmission and multiplication of torque between the input and output shafts can be interrupted at any time by emptying coupling 16 to break the driveline between the shafts. This is accomplished by venting the fluid pressure in line 78, thereby permitting the spring and centrifugal forces to move valve 76 to open passage 74, whereby the rotating mass of operating fluid in cavity 68 is evacuated to a sump.

FIGURE 2 illustrates a second form of transmission embodying the invention, and is similar to the FIGURE 1 transmission except for the substitution of an infinitely variable ball drive friction mechanism 14' for the disc drive 14 of FIGURE 1. It shows, in general, input and output shafts 10' and 12' connected for a drive therebetween by an infinitely variable speed ball friction drive mechanism 14' and a hydrodynamic drive device or fluid coupling 16'. More specifically, and describing only the differences with respect to FIGURE 1, shaft 10' is drive connected by a shell member 18' to the outer annular split race 120 of the variable speed ball drive 14'. This race is composed of a pair of spaced outer annular ball race members 122 and 124 slidably splined to shell 18', connectors 119, and having internal concave surfaces 126 and 128. The surfaces have substantially a point contact with a number of circumferentially spaced ball members 130 (only one shown) floatingly mounted in an annular cage 132 integral with a carrier member 134 fixed to a stationary portion 138 of the transmission housing. Diametrically opposite portions of the balls in turn have substantially a point contact with the concave internal surfaces 136 and 138 of a pair of spaced, inner annular ball race members 140 and 142 axially slidably secured to an intermediate shaft 34'.

The inner and outer races and balls are loaded into driving contact with each other by a number of fluid pressure operated servos 144 each having a piston 146 secured to a race member and operating in a cylinder 148. One pair of the servos generally is used to apply an axial pressure against the races to load the friction elements together for a drive, while the other pair is generally used to provide for an adjustment of the speed ratio of the ball drive in a manner to be described.

In operation, the rotating outer race members 122 and 124 provide a point contact drive of balls 130 in the same direction to drive the inner race members 140 and 142 and intermediate shaft 34' in the opposite direction. More specifically, the pistons 146 are actuated to axially move the inner races 140 and 142 together while separating the outer races 122 and 124 to permit the balls 130 to be displaced radially outwardly. Accordingly, point contacts are made at points 154 and 156 on the outer and inner races respectively, conditioning the ball drive for a maximum underdrive ratio of the inner races with respect to the speed of drive shaft 10'. Progressive axial movement of pistons 146 to spread the inner races apart and outer races together permits the balls 130 to be displaced radially inwardly, moving the outer and inner race point contacts arcuately to the points 158 and 160 to obtain an overdrive of the inner races 140 and 142 with respect to the speed of drive shaft 10'.

A neutral condition may be obtained by moving pistons 146 to relieve the loadings on all the race members, thereby interrupting the drive therebetween.

The intermediate shaft 34' as in FIGURE 1, is drivingly connected by the flange member 52' to the impeller member 58' of the fluid coupling 16'. With coupling 16' filled, and with the ball drive speed ratio set to provide a maximum underdrive of the inner races 140 and 142 with respect to input shaft 110, clockwise rotation of shaft 10' in the direction of arrow 193 drives outer race members 122 and 124 and balls 130 in the same direction, rotating inner race members 140 and 142, intermediate shaft 34' and impeller 58' in a counterclockwise direction and at a speed reduced from that of input shaft 10'. Accordingly, turbine 66' and output shaft 12' are driven in the same direction, which is opposite to that of input shaft 110, and at a speed reduction determined by the ratio of the ball drive unit. Progressive adjustment of pistons 146 to change the ball drive speed ratio from an underdrive to an overdrive of the inner races will therefore progressively increase the speed of output shaft 12' in the same manner.

As stated previously, a neutral condition can be obtained by emptying coupling 16'. When filled, the coupling serves as a means to cushion the change in torque loads between the input and output shafts.

A reverse drive may be obtained by means of the clutch 48' conecting the input shaft 10' directly to the impeller 58' and bypassing the ball drive 14'. The timed engagement of clutch 48' and release of the loading pressure on the ball races, therefore drives inner race members 140 and 142 and coupling 16' in the same direction as input shaft 10' to rotate output shaft 12' in the same direction and at the same speed except for hydraulic losses through the coupling. The inoperativeness of the friction drive 14' therefore eliminates friction losses during this reverse drive and provides higher operational efficiencies.

FIGURE 3 shows a modification of the transmission of FIGURE 2, providing a geared reverse drive. In this figure, a planetary gearset 301 of the simple three element type is inserted between the reverse clutch 48' and inner race of the ball drive 14', of FIGURE 2, the gearset being manually operable only when a reverse drive is desired. The connections between the input shaft 10'', ball drive 14'' and fluid coupling 16'' in this figure, and the operations of these units remain the same as in FIGURE 2; these details are therefore not repeated.

More specifically, the planetary gearset consists of a sun gear 301 fixed to the ball drive carrier 134'' by a connector 302, the sun gear meshing with a number (only one shown) of circumferentially spaced planet pinions 304. The pinions are rotatable supported upon a carrier 306 fixed for rotation with the inner race portions 140'' and 142'' of the ball drive 14'', and intermediate shaft 34''. The pinions mesh with an internal or ring gear 308 that can be selectively engaged with the power input shaft 10'' by the friction clutch 48''.

In operation of this embodiment, clutch 48'' is disengaged during all forward drive ranges of the transmission, and servos 44'' and 46'' are actuated to apply a loading pressure to the inner and outer ball races. Thus, the ball drive and coupling are conditioned for operation in the same manner as described in connection with the same elements in FIGURE 2. The gearset 300 merely idles without contributing any drive.

For reverse drive, clutch 48'' is engaged in timed relationship with the release of the loading pressures on the ball drive inner and outer races. The ball drive is thus rendered inoperable, while the gearset 300 is conditioned for a reduction drive therethrough by virtue of the sun gear 301 being fixed to the stationary carrier 134'' of the ball drive unit. Clockwise rotation of input shaft 10'' therefore rotates ring gear 308 in the same direction, causing the planet pinions to walk around the stationary sun gear 301 in the same direction at a speed reduced from the speed of the input shaft 10'' as determined by the diameters of the gears. Thus the ball drive is bypassed, and coupling 16'' and output shaft 12'' are driven at a reduced speed from that of shaft 10'', and in the same direction.

From the foregoing, it will be seen that the invention provides a variable speed torque transmitting mechanism providing an infinitely variable number of changes between predetermined underdrive and overdrive speed ratios, with very smooth changes between ratios; that interruption of drive may be obtained at any time simply by emptying the fluid coupling of operating fluid, and that the invention permits a reversal of the direction of rotation of the transmission output shaft in a simple manner.

While the invention has been illustrated in its preferred embodiments in the figures, it will be clear, to those skilled in the arts to which the invention pertains, that many changes and modifications may be made thereto without departing from the scope of the invention.

I claim:

1. An infinitely variable speed torque transmitting apparatus having rotatable input and output shafts, and means operably connecting said shafts, said means including an infinitely variable speed friction drive mechanism and a hydrodynamic drive device, said mechanism comprising first and second spaced annular rotatable friction members, an annular rotatable idler element between and frictionally engaging said first and second members for the drive of either of said members in one direction upon rotation of the other in the opposite direction, means connecting said first member to said input shaft, said device having a plurality of rotatable portions, means connecting said second member to one of said portions, means connecting another of said portions to said output shaft, said device being of the fluid fill and empty type for controlling the transmission of torque to said output shaft, rotation of said input shaft in one direction upon filling of said drive device providing a rotation of said output shaft in the opposite direction, and selectively operated clutch means directly connecting said input shaft and second member bypassing said mechanism and providing a drive to said output shaft in the one direction.

2. An infinitely variable speed torque transmitting apparatus having rotatable input and output shafts, and means operably connecting said shafts, said means including an infinitely variable speed friction disc drive mechanism and a hydrodynamic drive device, said mechanism comprising first and second spaced annular rotatable friction discs, an annular rotatable idler disc between and frictionally engaging said first and second discs for the drive of either of said discs in one direction upon rotation of the other in the opposite direction, means connecting said first disc to said input shaft, said device having a plurality of rotatable portions, means connecting said second disc to one of said portions, means connecting another of said portions to said output shaft, said device being of the fluid fill and empty type for controlling the transmission of torque to said output shaft, rotation of said input shaft in one direction upon filling of said drive device providing a rotation of said output shaft in the opposite direction, and selectively operated clutch means directly connecting said input shaft and second disc bypassing said mechanism and providing a drive to said output shaft in the one direction.

3. An infinitely variable speed torque transmitting apparatus having rotatable input and output shafts, and means operably connecting said shafts providing a neutral and an infinite number of drives therebetween, said means including an infinitely variable speed friction disc drive mechanism and a hydrodynamic drive device, said mechanism comprising first and second spaced rotatable friction discs, a rotatable idler disc between and frictionally engaging said first and second discs for the drive of either of said discs in one direction upon rotation of the other in the opposite direction, means connecting said first disc to said input shaft, said device having a rotatable pump connected to said second disc and a rotatable turbine connected to said output shaft, said device being of the fluid fill and empty type for controlling the transmission of torque to said output shaft, means for adjusting said friction disc drive for an infinite number of speed ratios between said first and second discs, the rotation of said input shaft in one direction upon filling of said drive device providing a rotation of said output shaft in the opposite direction, and fluid pressure operated clutch means for directly connecting said input shaft and second disc to bypass said mechanism and provide a drive of said output shaft in the same direction as said input shaft, the emptying of said drive device interrupting the transmission of torque from said input to said output shafts.

4. An infinitely variable speed torque transmitting apparatus having rotatable input and output shafts, and means operably connecting said shafts, said means including an infinitely variable speed friction disc drive mechanism and a hydrodynamic drive device, said mechanism comprising first and second spaced annular rotatable friction members, an annular element between and frictionally engaging said first and second members for the drive of either of said members in one direction upon rotation of the other in the opposite direction, means connecting said first member to said input shaft, said device having a plurality of rotatable portions, means connecting said second member to one of said portions, means connecting another of said portions to said output shaft, said device being of the fluid fill and empty type for controlling the transmission of torque to said output shaft, rotation of said input shaft in one direction upon filling of said drive device providing a rotation of said output shaft in the opposite direction, and selectively operated clutch means directly connecting said input shaft and second member bypassing said mechanism and providing a drive to said output shaft in the one direction, selectively operated means associated with said device for controlling the filling and emptying of said device to control the transmission of torque therethrough, means for adjusting said friction drive for an infinite number of speed ratios between said first and second discs, the rotation of said input shaft in one direction upon operation of said means to fill said drive device providing a rotation of said output shaft in the opposite direction, and fluid pressure operated clutch means connecting said input shaft and second disc for bypassing said mechanism and providing a drive of said output shaft in the same direction as said input shaft, the operation of said means to empty said drive device interrupting the transmission of torque from said input to said output shafts.

5. A torque transmitting apparatus having rotatable input and output shafts, and means connecting said shafts providing a neutral and an infinitely variable number of drives therebetween, said means including an infinitely variable friction disc drive mechanism and a fluid coupling, said coupling having a rotatable pump and turbine, said mechanism having outer and inner friction discs frictionally engaged by an idler friction disc therebetween to provide a drive of said inner discs in a direction opposite to the rotation of said outer discs, means connecting said outer discs to said input shaft and said inner discs to said pump, said coupling being capable of being filled and emptied of fluid, means connecting said turbine to said output shaft, means for radially adjusting said idler disc to change the drive ratio between said discs and provide an infinite number of overdrive and direct drive and underdrive speed ratios between said outer and inner disc members, the rotation of said input shaft in one direction upon filling of said coupling providing a rotation of said output shaft in the opposite direction, and selectively operable clutch means connecting said input shaft and inner members bypassing said mechanism and providing a drive of said output shaft in the same direction as said input shaft, the emptying of said coupling interrupting the transmission of torque from said input to said output shafts thereby providing a neutral condition of operation.

6. An infinitely variable speed torque transmitting apparatus having rotatable input and output shafts, and means operably connecting said shafts, said means including an infinitely variable speed friction drive mechanism and a hydrodynamic drive device, said mechanism comprising first and second spaced annular rotatable friction members, an annular rotatable idler element between and frictionally engaging said first and second members for the drive of either of said members in one direction upon rotation of the other in the opposite direction, means connecting said first member to said input shaft, said device having a plurality of rotatable portions, means connecting said second member to one of said portions, means connecting another of said portions to said output shaft, said device having selectively operable means associated therewith for selectively controlling the transmission or non-transmissibility of torque from said second member to said output shaft, rotation of said input shaft in one direction upon operation of said selectively operable means to transmit torque to said output shaft providing a rotation of said output shaft in the opposite direction, and selectively operated clutch means directly connecting said input shaft and second member bypassing said mechanism and providing a drive to said output shaft in the one direction.

7. An infinitely variable speed torque transmitting apparatus having rotatable input and output shafts, and means operably connecting said shafts, said means including an infinitely variable speed friction drive mechanism, a hydrodynamic drive device, and a planetary gearset, said mechanism comprising first and second spaced annular rotatable friction members, and annular rotatable idler element between and frictionally engaging said first and second members for the drive of either of said members in one direction upon rotation of the other in the opposite direction, means connecting said first member to said input shaft, said device having a plurality of rotatable portions, means connecting said second member to one of said portions, means connecting another of said portions to said output shaft, said device having selectively operable means associated therewith for selectively controlling the transmission or non-transmissibility of torque from said second member to said output shaft, said gearset having a plurality of rotatable members, means holding one of said members stationary to provide a reduction drive through said gearset, means connecting another member of said gearset to said second friction member, rotation of said input shaft in one direction upon operation of said selectively operable means to transmit torque to said output shaft providing a rotation of said output shaft in the opposite direction, and selectively operated clutch means directly connecting said input shaft to an input member of said gearset bypassing said mechanism and providing a drive to said output shaft in the one direction.

8. An infinitely variable speed torque transmitting apparatus having rotatable input and output shafts, and means operably connecting said shafts, said means including an infinitely variable speed friction ball drive mechanism and a hydrodynamic drive device, said mechanism comprising first and second spaced annular rotatable friction race members, an annular rotatable idler ball between and frictionally engaging said first and second race members for the drive of either of said races in one direction upon rotation of the other in the opposite direction, means connecting said first race member to said input shaft, said device having a plurality of rotatable portions, means connecting said second race member to one of said portions, means connecting another of said portions to said output shaft, said device being of the fluid fill and empty type for controlling the transmission of torque to said output shaft, rotation of said input shaft in one direction upon filling of said drive device providing a rotation of said output shaft in the opposite direction, and selectively operated clutch means directly connecting said input shaft and second race member bypassing said mechanism and providing a drive to said output shaft in the one direction.

9. A torque transmitting apparatus having rotatable input and output shafts, and means connecting said shafts providing a neutral and an infinitely variable number of drives therebetween, said means including an infinitely variable friction ball drive mechanism and a fluid coupling, said coupling having a rotatable pump and turbine, said mechanism having outer and inner friction races frictionally engaged by an idler ball therebetween to provide a drive of said inner race in a direction opposite to the rotation of said outer race, means connecting said outer race to said input shaft and said inner race to said pump, said coupling being capable of being filled and emptied of fluid, means connecting said turbine to said output shaft, means for radially adjusting said ball to change the drive ratio between said races and provide an infinite number of overdrive and direct drive and underdrive speed ratios between said outer and inner disc members, the rotation of said input shaft in one direction upon filling of said coupling providing a rotation of said output shaft in the opposite direction, and selectively operable clutch means connecting said input shaft and inner race bypassing said mechanism and providing a drive of said output shaft in the same direction as said input shaft, the emptying of said couplying interrupting the transmission of torque from said input to said output shafts thereby providing a neutral condition of operation.

10. A torque transmitting apparatus having rotatable input and output shafts, and means connecting said shafts providing a neutral and an infinitely variable number of drives therebetween, said means including an infinitely variable friction ball drive mechanism and a fluid coupling and a planetary gearset, said coupling having a rotatable pump and turbine, said mechanism having outer and inner friction races frictionally engaged by an idler ball therebetween to provide a drive of said inner race in a direction opposite to the rotation of said outer race, means connecting said outer race to said input shaft and said inner race to said pump, said coupling being capable of being filled and emptied of fluid, means connecting said turbine to said output shaft, means for radially adjusting said ball to change the drive ratio between said races and provide an infinite number of overdrive and direct drive and underdrive speed ratios between said outer and inner disc members, the rotation of said input shaft in one direction upon filling of said coupling providing a rotation of said output shaft in the opposite direction, said gearset having intermeshed ring and sun and planet gears and a planet carrier, means holding one of said sun and ring gears stationary to provide a reduction drive through said gearset, means connecting said carrier to said inner race and pump, and selectively operable clutch means connecting said input shaft race to the other of said sun and ring gears bypassing said mechanism and providing a drive of said output shaft in the same direction as said input shaft, the emptying of said coupling interrupting the transmission of torque from said input to said output shafts thereby providing a neutral condition of operation.

11. An infinitely variable speed torque transmitting apparatus having rotatable input and output shafts, and means operably connecting said shafts, said means including an infinitely variable speed friction drive mechanism and a hydrodynamic drive device, said mechanism comprising first and second spaced annular rotatable friction members, an annular rotatable idler element between and frictionally engaging said first and second members for the drive of either of said members in one direction upon rotation of the other in the opposite direction, means connecting said first member to said input shaft, said device having a plurality of rotatable portions, means connecting said second member to one of said portions, means connecting another of said portions to said output shaft, said device providing a progressive and smooth transfer of torque from said second member to said output shaft, rotation of said input shaft in one direction providing a rotation of said output shaft in the opposite direction, and selectively operated clutch means directly connecting said input shaft and second member bypassing said mechanism and providing a drive to said output shaft in the one direction.

References Cited by the Examiner
UNITED STATES PATENTS 2,660,073 11/53 Patin _____ 74—691
3,006,206 10/61 Kelley et al. _____ 74—199 X DON A WAITE, *Primary Examiner.*